Sept. 13, 1966 H. R. CAMENZIND 3,273,077

SCR SINE WAVE GENERATOR

Filed Feb. 26, 1965

INVENTOR
HANS R. CAMENZIND
BY Robert Levine
ATTORNEY

United States Patent Office 3,273,077

Patented Sept. 13, 1966

3,273,077

SCR SINE WAVE GENERATOR

Hans R. Camenzind, Lexington, Mass., assignor to P. R. Mallory & Co. Inc., Indianapolis, Ind., a corporation of Delaware Filed Feb. 26, 1965, Ser. No. 435,542

7 Claims. (Cl. 331—116)

This invention relates to a sine wave generator of the solid-state type and, particularly, of high power output.

Sine wave generators using thermionic tubes are of low overall efficiency, bulky, generate considerable heat (which reduces reliability), as well as being comparatively expensive. Generators built with semiconductor diodes and transistors overcome those deficiencies but produce low output. But using multi-layer semiconductor switching devices such as silicon controlled rectifiers (SCR), a sine wave generator can be made having all the advantages of a transistorized generator and, additionally, having high power output.

The present invention, in another of its aspects, relates to novel features of the instrumentalities described herein for teaching the principal object of the invention and to the novel principles employed in the instrumentalities whether or not these features and principles may be used in the said object and/or in the said field.

Therefore, it is a primary object of this invention to produce a sine wave generator using solid state components.

Another object is to produce a sine wave generator using multi-layer semiconductors such as SCR's.

A further object is to produce a sine wave generator having a multi-layer semiconductor device capable of being triggered by light or a steep wave-front.

Still another object is to produce a sine wave generator using a four or five layer semiconductor device.

A further object is to build a sine wave generator of high efficiency and output.

Another object is to produce an ultrasonic sine wave generator of high efficiency and output.

Other objects of the present invention and the nature thereof will become apparent from the following description considered in connection with the accompanying figures of the drawings wherein like reference characters describe elements of similar function therein, and wherein the scope of the invention is determined rather from the dependent claims.

Preferred embodiments of this invention are pictured in the accompanying sheet of drawings and described as follows.

Figure 1:
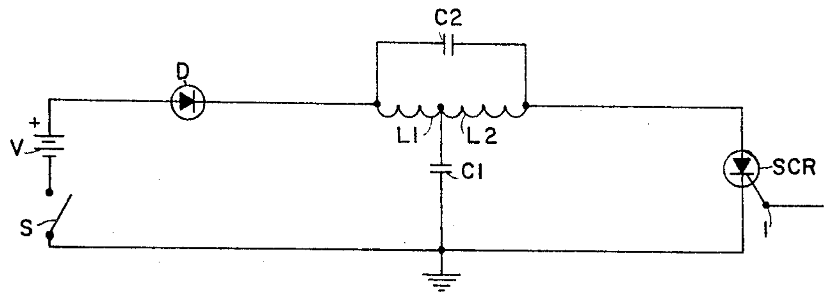
FIGURE 1 is a basic schematic diagram of this invention.

The operation of the circuit shown in FIGURE 1 is as follows: the positive terminal of a battery V is connected to the anode of diode D and the negative terminal of battery V is connected to one side of switch S. The cathode of diode D is connected to one end of a center-tapped inductor consisting of two halves L1 and L2. The opposite end of the inductor is connected to the anode of a silicon controlled rectifier SCR and the cathode of the SCR is connected to ground. The remaining side of switch S is grounded. A capacitor C1 is connected between the center-tap of inductor L1 and L2 and ground. Another capacitor C2 is shunted across inductor L1–L2. The gate circuit of the SCR is terminated at 1.

When switch S is closed, current from the battery V flows through diode D, which is forward biased, and L1 to charge capacitor C1. When the voltage across capacitor C1 is substantially equal to the battery voltage V, a positive pulse applied to the gate 1 of the silicon controlled rectifier SCR will cause it to fire and the resistance from anode to cathode drop to a low value which can be disregarded for this analysis. Capacitor C1 is shunted across inductor half L2 and discharges into it thus creating a magnetic field around L2. The flow of current through L2 causes an opposing voltage across L2 and a similar voltage is also induced in L1. This reverse biases diode D, thus preventing any flow of current from the battery V and, as soon as the current though L2 drops below the holding current value of the SCR, the latter switches off whereupon the cycle can be repeated indefinitely. The energy stored in C1 and transferred to L2 will shock excite the resonant Circuit C2–L1–L2 into oscillation at a frequency equal to $$\frac{1}{2\pi\sqrt{LC}}$$

where L and C are the effective inductance and capacitance, respectively.

Figure 2:
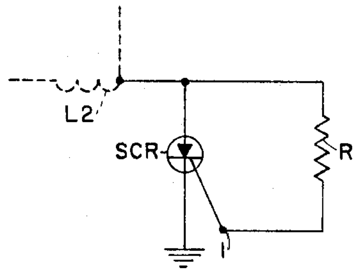
FIGURE 2 is a fragmentary view of FIGURE 1 plus a triggering circuit.

This oscillator may be made self-triggering by connecting a resistor of proper value between gate terminal 1 and the anode of the SCR as shown fragmentarily in FIGURE 2. As the voltage increases on the anode of the SCR, the gate current will increase until it reaches a value where the SCR conducts. As soon as the current through the SCR drops below the holding value, the SCR becomes non-conducting and the gate current drops below the triggering value. This action continues indefinitely.

Coupling to an external circuit may be readily accomplished by inductively coupling to L1–L2 or directly across capacitor C2 or by using a dual capacitor for C2 and tapping across either one for best impedance matching.

Figure 3:
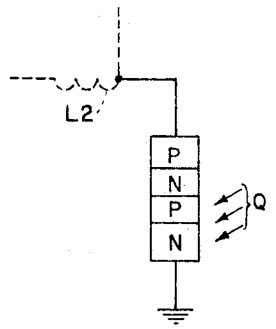
FIGURE 3 is a fragmentary view of FIGURE 1 with a 4-layer diode replacing the SCR.

FIGURE 3 is a fragment of the schematic shown in FIGURE 1 wherein a 4-layer diode is employed and becomes conducting when a light beam Q is flashed on that diode.

Figure 4:
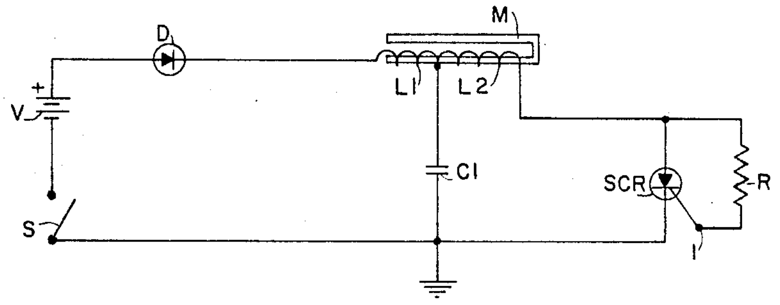
FIGURE 4 illustrates the same principle applied to a magnetostriction transducer.

FIGURE 4 illustrates circuitry for an ultrasonic generator suitable for use in ultrasonic cleaning devices. The core M is made of magnetostrictive material, such as nickel, and may be placed in contact with the object to be vibrated which may be fluid or solid. The operation is the same as shown in FIGURE 2 except for the omission of capacitor C2. Instead of using a discrete capacitor, tuning is accomplished by making use of the distributed capacitance of the inductor L1–L2 in adjusting to the resonant value of the core M.

It is also quite practical to use A.C. for a voltage source by using a bridge rectifier connected between the A.C. input and generator input to provide full wave pulsating direct current. This will produce outputs of bursts at twice the input frequency.

Either continuous or bursts of output are suitable for a number of applications. In addition to ultrasonic cleaning, the output may be used for induction heating, dielectric bonding, and other applications which will be obvious to those skilled in the art.

The detailed explanation of the present invention, as hereinbefore described in one of its embodiments, is merely illustrative and not exhaustive in scope. Since many widely different embodiments of the invention may be made without departing from the scope thereof, it is intended that all matter contained in the above description and shown in the accompanying drawings shall be interpreted as illustrative and not in a limiting sense.

Having disclosed fully the nature of and usefulness of this invention, the following claims are made:

1. An alternating current sine wave generator activated by a direct current source having positive and negative terminals, said generator comprising: a diode having a cathode and an anode; an autotransformer having start and finish terminals with a tap approximately centrally located thereon and a capacitance means attached thereto; a silicon controlled rectifier having an anode, a cathode and a gate; said positive terminal of said direct current source connected to said anode of said diode; said cathode of said diode connected to said start terminal of said autotransformer; said finish terminal of said autotransformer connected to said anode of said silicon controlled rectifier; a capacitor, said capacitor connected between said tap on said autotransformer and a common point between said negative terminal of said direct current source and said cathode of said silicon controlled rectifier; and means for triggering said silicon controlled rectifier at predetermined times so as to provide a sine wave output across said capacitance means at a frequency determined by the characteristics of said capacitance means, said capacitor, and said autotransformer, said triggering means connected to said gate of said silicon controlled rectifier.

2. An alternating current sine wave generator activated by a direct current source having positive and negative terminals, said generator comprising: a diode having a cathode and an anode; an autotransformer having start and finish terminals with a tap approximately centrally located thereon and a distributed capacitance means attached thereto; a silicon controlled rectifier having an anode, a cathode and a gate; said positive terminal of said direct current source connected to said anode of said diode; said cathode of said diode connected to said start terminal of said autotransformer; said finish terminal of said autotransformer connected to said anode of said silicon controlled rectifier; a capacitor, said capacitor connected between said tap on said autotransformer and a common point between said negative terminal of said direct current source and said cathode of said silicon controlled rectifier; and means for triggering said silicon controlled rectifier at predetermined times so as to provide a sine wave output across said capacitance means at a frequency determined by the characteristics of said distributed capacitance means, said capacitor, and said autotransformer, said triggering means connected to said gate of said silicon controlled rectifier.

3. An alternating current sine wave generator activated by a direct current source having positive and negative terminals, said generator comprising: a diode having a cathode and an anode; an autotransformer having start and finish terminals with a tap approximately centrally located thereon and a core made of magnetostrictive material for providing a distributed capacitance tuning effect; a silicon controlled rectifier having an anode, a cathode and a gate; said positive terminal of said direct current source connected to said anode of said diode; said cathode of said diode connected to said start terminal of said autotransformer; said finish terminal of said autotransformer connected to said anode of said silicon controlled rectifier; a capacitor, said capacitor connected between said tap and said autotransformer and a common point between said negative terminal of said direct current source and said cathode of said silicon controlled rectifier; and means for triggering said silicon controlled rectifier at predetermined times so as to provide a sine wave output across said anutotransformer at a frequency determined by the characteristics of said capacitor and said autotransformer, said triggering means connected to said gate of said silicon controlled rectifier.

4. An alternating current sine wave generator activated by a direct current source having positive and negative terminals, said generator comprising: a diode having a cathode and an anode; an autotransformer having start and finish terminals with a tap approximately centrally located thereon and a capacitance means attached thereto; a silicon controlled rectifier having an anode, a cathode and a gate; said positive terminal of said direct current source connected to said anode of said diode; said cathode of said diode connected to said start terminal of said autotransformer; said finish terminal of said autotransformer connected to said anode of said silicon controlled rectifier; a capacitor, said capacitor connected between said tap on said autotransformer and a common point between said negative terminal of said direct current source and said cathode of said silicon controlled rectifier; and means for triggering said silicon controlled rectifier at predetermined times so as to provide a sine wave output across said capacitance means at a frequency determined by the characteristics of said capacitance means, said capacitor, and said autotransformer, said triggering means comprising a resistor connected between said anode and said gate of said silicon controlled rectifier.

5. An alternating current sine wave generator activated by a direct current source having positive and negative terminals, said generator comprising: a diode having a cathode and an anode; an autotransformer having start and finish terminals with a tap approximately centrally located thereon and a capacitance means attached thereto; a light actuated silicon controlled rectifier having an anode and a cathode; said positive terminal of said direct current source connected to said anode of said diode; said cathode of said diode connected to said start terminal of said autotransformer; said finish terminal of said autotransformer connected to said anode of said silicon controlled rectifier; a capacitor, said capacitor connected between said tap on said autotransformer and a common point between said negative terminal of said direct current source and said cathode of said silicon controlled rectifier; and means for triggering said silicon controlled rectifier at predetermined times so as to provide a sine wave output across said capacitance means at a frequency determined by the characteristics of said capacitance means, said capacitor, and said autotransformer, said triggering means comprising a light source for producing a light beam directed at said silicon controlled rectifier and a shutter for periodically permitting said light beam to impinge on said silicon controlled rectifier.

6. An alternating current sine wave generator activated by a direct current source having positive and negative terminals, said generator comprising: a diode having a cathode and an anode; an autotransformer having start and finish terminals with a tap approximately centrally located thereon and a core made of magnetostrictive material for providing a distributed capacitance tuning effect; a silicon controlled rectifier having an anode, a cathode and a gate; said positive terminal of said direct current source connected to said anode of said diode; said cathode of said diode connected to said start terminal of said autotransformer; said finish terminal of said autotransformer connected to said anode of said silicon controlled rectifier; a capacitor, said capacitor connected between said tap on said autotransformer and a common point between said negative terminal of said direct current source and said cathode of said silicon controlled rectifier; and means for triggering said silicon controlled rectifier at predetermined times so as to provide a sine wave output across said autotransformer at a frequency determined by the characteristics of said magnetostrictive core, said capacitor, and said autotransformer, said triggering means comprising a resistor connected between said anode and said gate of said silicon controlled rectifier.

7. An alternating current sine wave generator activated by a direct current source having positive and negative terminals, said generator comprising: a diode having a cathode and an anode; an autotransformer having start and finish terminals with a tap approximately centrally located thereon and a distributed capacitance means attached thereto; a silicon controlled rectifier having an anode, a cathode and a gate; said positive terminal of said direct current source connected to said anode of said diode; said cathode of said diode connected to said start terminal of said autotransformer; said finish terminal of said autotransformer connected to said anode of said silicon controlled rectifier; a capacitor, said capacitor connected between said tap on said autotransformer and a common point between said negative terminal of said direct current source and said cathode of said silicon controlled rectifier; and means for triggering said silicon controlled rectifier at predetermined times so as to provide a sine wave output across said capacitance means at an ultrasonic frequency determined by the characteristics of said distributed capacitance means, said capacitor, and said autotransformer, said triggering means connected to said gate of said silicon controlled rectifier.

References Cited by the Examiner

FOREIGN PATENTS 700,419 12/1964 Canada.

OTHER REFERENCES

Murray, Designers Handbook, Silicon Controlled Rectifier, copyright 1963, Sept. 25, 1963, by Westinghouse Electric Corp., pages 7–59 through 7–65.

References Cited by the Applicant

UNITED STATES PATENTS 3,049,642 8/1962 Quinn.

3,134,048 5/1964 Wolfframm et al.

OTHER REFERENCES

Electronics; Aug. 9, 1963, pp. 56–57; SCR Manual; General Electric Co., 2nd Ed., Application Note #200.24; An SCR Circuit To Produce High Frequency Power, Neville Mapham.

ROY LAKE, *Primary Examiner.*

JOHN KOMINSKI, *Assistant Examiner.*